S. A. GREGG.
Improvement in Velocipede.

No. 125,451. Patented April 9, 1872.

Witnesses:
Chas. Nida
Geo. W. Mabee

Inventor:
S. A. Gregg
per Munn & Co.
Attorneys.

125,451

UNITED STATES PATENT OFFICE.

SOLON A. GREGG, OF ONEIDA, NEW YORK.

IMPROVEMENT IN VELOCIPEDES.

Specification forming part of Letters Patent No. 125,451, dated April 9, 1872.

Specification describing a new and useful Improvement in Velocipedes, invented by SOLON A. GREGG, of Oneida, in the county of Madison and State of New York.

Figure 1:
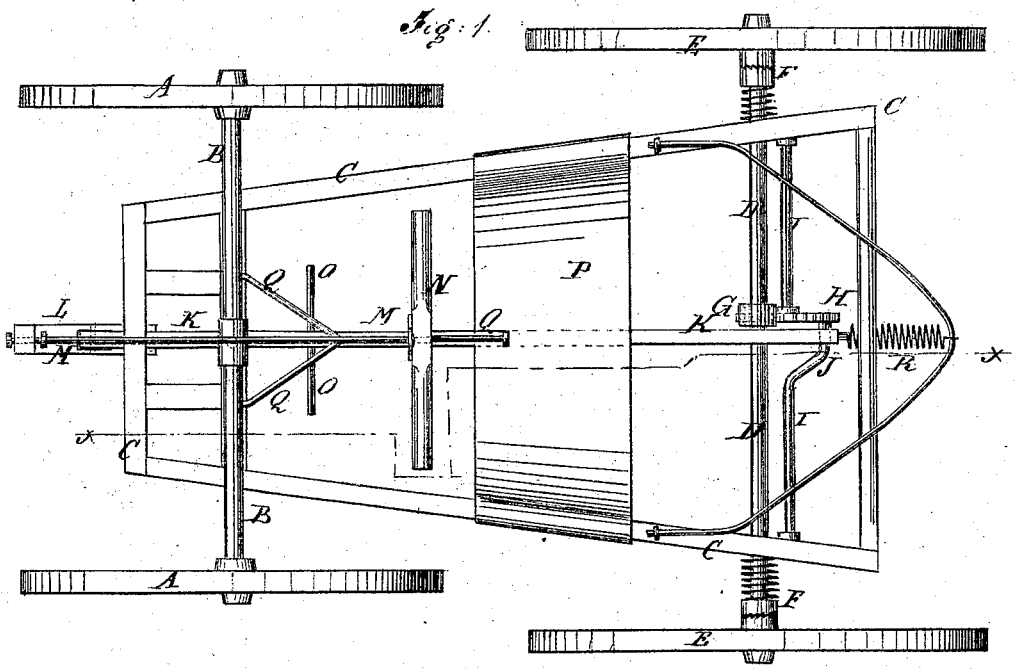
Figure 2:
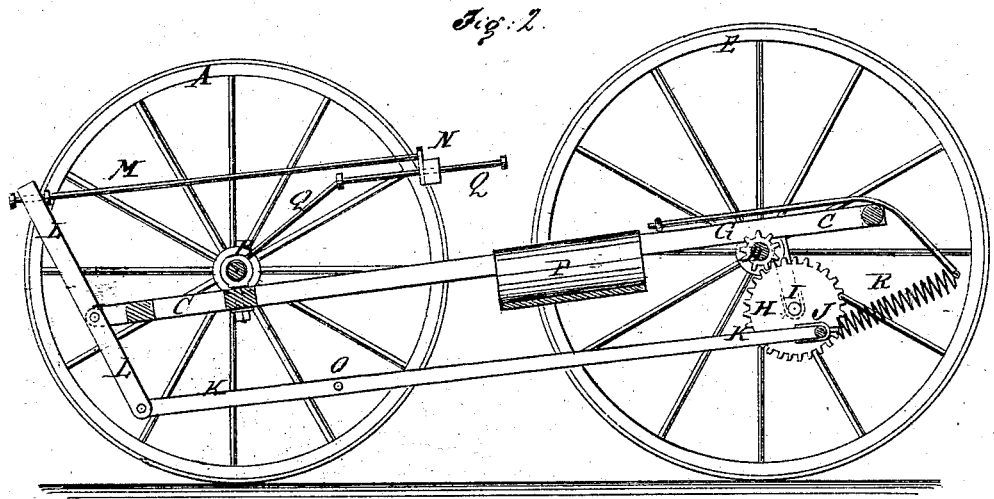

Figure 1 is a top view of my improved velocipede. Fig. 2 is a detail vertical longitudinal section of the same taken through the line $x\ x$, Fig. 1.

Similar letters of reference indicate corresponding parts.

My invention has for its object to furnish an improved velocipede-wagon simple in construction and convenient in use, being so constructed as to adapt it for use upon common roads; and it consists in the construction and combination of various parts, as hereinafter more fully described.

A are the forward wheels, which revolve loosely upon the journals of the axle B, which is swiveled at its center to the middle part of the forward end of the frame C. D is the rear axle, which revolves in bearings attached to the rear part of the frame C. E are the rear wheels, which are rigidly attached to the axle D, or are connected with said axle by clutches F or by pawls and ratchets, as may be desired. To the axle D is attached a small gear-wheel, G, the teeth of which mesh into the teeth of the larger gear-wheel H, attached to the shaft I, the journals of which revolve in bearings attached to brackets or other supports attached to the rear part of the frame C. Upon the center of the shaft I is formed a crank, J, to which is pivoted the rear end of the driving-pitman K, by means of which the power is applied. The crank J, to which the driving-pitman K is pivoted, may be formed upon the axle D, so that the power may be applied directly to said axle D. This arrangement will give the machine more power but less speed. The forward end of the pitman K is pivoted to the lower end of the lever L, which is pivoted at or near its middle part to the forward end of the frame C. To the upper end of the lever L is pivoted the rear end of a rod, M, to the rear end of which is pivoted or attached a hand-bar, N. To the forward part of the pitman K are attached foot-rests O to receive the feet of the rider, who sits upon the seat P, attached to the frame C.

The seat P, foot-rests O, and hand-bar N are so arranged, with respect to each other, that the rider sitting upon the seat P can rest his feet upon the foot-rests O and grasp the hand-bar N with his hands, the muscular force of both arms and legs being thus applied at the same time for propelling the machine.

Two or more sets of foot-rests O may be attached to the pitman K, so that the same machine may be operated by persons of different lengths of limbs.

Q is a rod, the forward end of which is branched and attached to the forward axle B. The rear end of the rod Q passes through and slides in the middle part of the hand-bar N. By this construction the rider can guide the velocipede while driving it with both hands and feet by simply moving the hand-bar N a little to one or the other side.

R is a spring, the forward end of which is attached to the rear end of the pitman K. The rear end of the spring R is attached to the rear part of the frame C, or to some suitable support attached to said frame. The spring R is designed to draw the pitman K back after being forced forward by the hands and feet of the operator, and to be so arranged as to always carry the crank J off its dead-point, so that the application of power to the pitman K will always start the machine.

The machine may be made with one forward wheel, if desired, instead of with two, as shown in the drawing.

The velocipede is designed to be made of such a size and strength that a pair of shafts may be attached to it when desired to use it with horse-power.

Having thus described my invention, what I claim as new, and desire to secure by Letters Patent, is—

1. The combination of the hand-bar N, rod M, lever L, pitman K, foot-rests O, and crank J with each other and with the frame C and axle D of the velocipede, gear-wheels G H, and shaft I, substantially as herein shown and described, and for the purpose set forth.

2. The combination of the rod Q with the swiveled axle B, hand-bar N, rod M, lever L, pitman K, foot-rests O, crank J, and axle D, substantially as herein shown and described, and for the purpose set forth.

3. The combination of the spring R with the pitman K, foot-rests O, crank J, axle D, lever L, rod M, and hand-bar N, substantially as herein shown and described, and for the purpose set forth.

SOLON A. GREGG.

Witnesses:
E. C. PHILPOT, *Eaton, Mad. Co., N. Y.*
R. W. STURDEVANT, *Oneida, N. Y.*
H. RIVENBURGH, *Oneida, N. Y.*